United States Patent [19]
Divies et al.

[11] Patent Number: 5,953,680
[45] Date of Patent: Sep. 14, 1999

[54] METHOD FOR CREATING A 2D KINEMATIC MODEL OF GEOLOGICAL BASINS AFFECTED BY FAULTS

[75] Inventors: Renaud Divies, Neuilly; William Sassi, Fourqueux, both of France

[73] Assignee: Institut Francais du Petrole, Rueil-Malmaison, France

[21] Appl. No.: 08/852,575

[22] Filed: May 7, 1997

[30] Foreign Application Priority Data

May 7, 1996 [FR] France ................................. 96 05736

[51] Int. Cl.⁶ ..................................................... G06F 19/00
[52] U.S. Cl. ................................................. 702/5; 702/13
[58] Field of Search ................................... 702/11, 17, 5, 702/12, 13; 434/299, 403, 430; 367/72, 73, 68, 69, 70, 71

[56] References Cited

U.S. PATENT DOCUMENTS

| | | | |
|---|---|---|---|
| 1,425,705 | 7/1922 | Sheppard | 434/299 |
| 4,991,095 | 2/1991 | Swanson . | |
| 5,808,964 | 9/1998 | Lailly et al. | 367/73 |
| 5,838,634 | 11/1998 | Jones et al. | 367/73 |

FOREIGN PATENT DOCUMENTS 95 30209 of 1995 WIPO .

OTHER PUBLICATIONS

Revue De L'Institut Francais du Petrole, vol. 50, No. 3, May 1, 1995, pp. 303–336, XP000512978; Pissetski, V.B.: "Dislocational Rock Mechanics as a Basis for Seismic Methods . . . For Hydrocarbons".

Journal of Structural Geology, vol. 12, No. 3, Jan. 3, 1990, pp. 375–381, XP000576747; Waltham, D.; "Final Difference Modelling of Sandbox Analogues Compaction and Deteachment Free Deformation" *p. 379*.

J.G.R. Journal of Geophysical Research, vol. 95, No. B13, Dec. 10, 1990, pp. 21, 913–921, 929, XP000576751, Contrerad, J. et al: "Kinematic Modeling of Cross–Sectional Deformation . . . Simulation".

*Primary Examiner*—Donald E. McElheny, Jr.
*Attorney, Agent, or Firm*—Antonelli, Terry, Stout & Kraus, LLP

[57] ABSTRACT

A Method for modeling, from an initial undeformed state, the evolution of a rock basin in the course of time taking into account a) the sliding along major tectonic discontinuities with internal deformation of sediments and at the same time b) mechanical compaction due to burial of sediments by tectonic deformation or sedimentation. After first subdividing the geological objects in the basin into a number of layers or banks by limits (stratigraphic discontinuities defining banks, faults defining imbricate structures, etc.) whose geometric positions are known, the banks are defining by grids. The tectonic deformation of each modeled layer is determined separately taking its thickness and length into account as far as possible, and the grids are modified to take into account the compaction associated with the degree to which the grid elements are buried. All the intermediate geometries of the evolution process are obtained incrementally. The model thus constructed gives information on the variation in permeability, expulsion of fluid by compaction, and heat transfers on the scale of the basin by circulation of fluids.

The method has an application to finding underground hydrocarbon reservoirs.

9 Claims, 3 Drawing Sheets

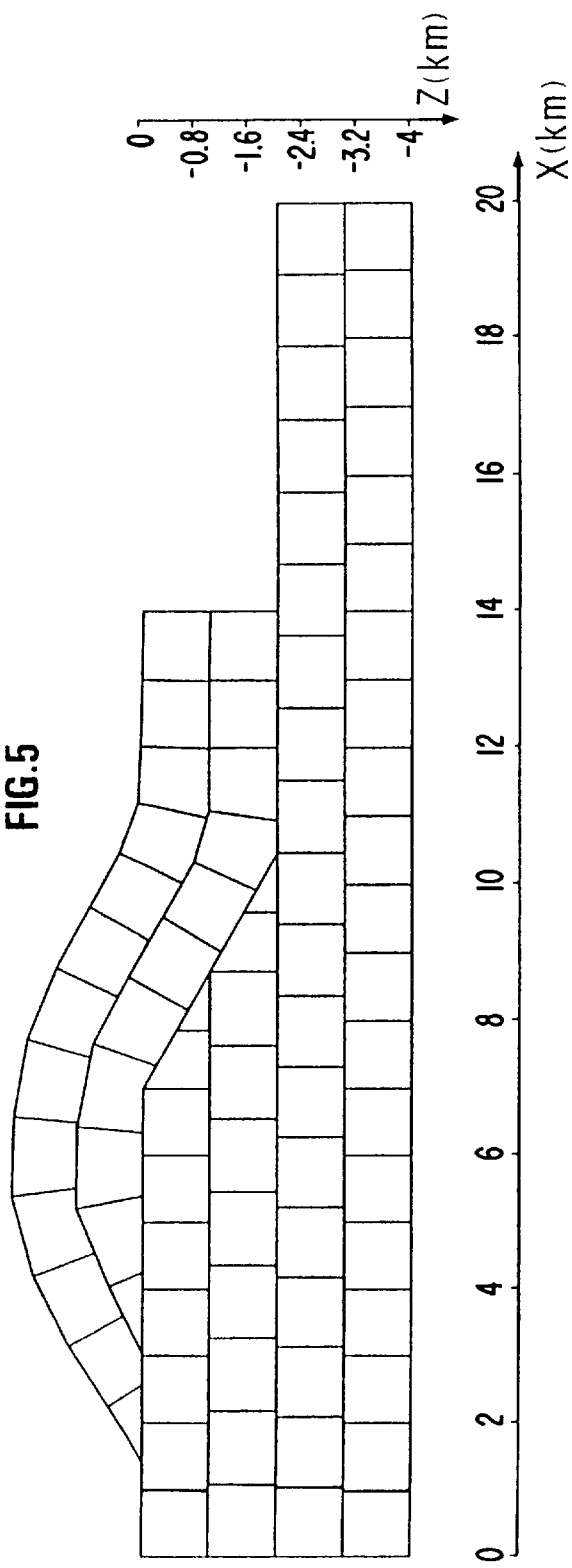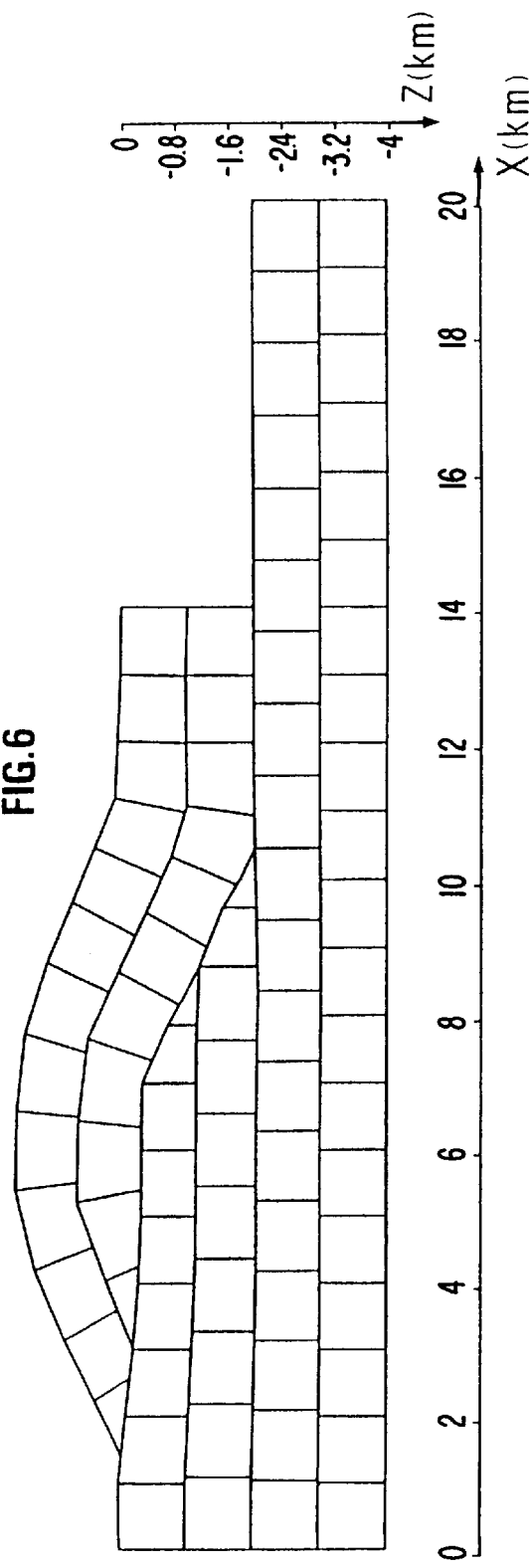

METHOD FOR CREATING A 2D KINEMATIC MODEL OF GEOLOGICAL BASINS AFFECTED BY FAULTS

BACKGROUND OF THE INVENTION

1. Field of the Invention

The present invention relates to a method for creating a.

2. Description of the Prior Art

Methods are know that have been developed to model the evolution of the geometry of geological basins affected by displacements along major faults. Such a method is described for example by Rouve, F. and Sassi, W., "Kinematics of Deformation and Petroleum System Appraisal in Neogen Foreland Fold-and-Thrust Belts" in Petrol. Geosciences, Vol. 1, 1995, porosity. 253–269.

The sedimentary series transported are then subjected to internal deformation. Known models define this either by a simple vertical shear mode or by a shear mode in parallel isopaque folds (known as the "kinks method"). The layers of sediments in this model are considered to form a continuous medium.

Models have been proposed in particular by:

Suppe, J., "Geometry and Kinematics of Fault-Bend Folding," Am. Journ. of Science, 283, pp. 684–721 (1993), and by Zoetemeijer, R., "Tectonic Modelling of Foreland Basins." Doctoral thesis, Free University of Amsterdam, 1983.

These models result from implementing the method known as Isopaque Kink Folding, but do not deal with mechanical compaction.

A modeling method that allows coupling with compaction is also known, described by:

Waltham, "Finite Difference Modelling of Sandbox Analogues, Compaction and Detachment Free Deformation," in Journal of Structural Geology, vol. 12, 3, 375–381, 1190, which considers simple local shears but without looking at the lengths and thicknesses of the banks.

Another modeling method has also been proposed by:

Suter, M., "Kinematic Modelling of Cross-sectional Deformation Sequences by Computer Simulation," Journ. of Geophys. Research, Vol. 96, B13, 21913–21929, 1990.

SUMMARY OF THE INVENTION

The method according to the invention models the geometric evolution over time of a geological basin affected by displacements along faults, with each intermediate geometry of the evolution process being determined incrementally.

The model created according to the invention directly reconstructs intermediate geometries of the basin over time from an initial undeformed state. Two deformation mechanisms are accounted for in the method: a) sliding along major tectonic discontinuities with internal deformation (folding) of sediments and b) mechanical compaction due to burial of the sediments by tectonic deformation of sedimentation.

The model created by the method also allows coupling of the deformation linked to the set of faults with compaction phenomenon. The model gives information on the variation in permeability, expulsion of fluids by compaction, and heat transfers on the basin scale by circulation of fluids.

The geological formation having first been subdivided into a certain number of geological objects by limits (stratigraphic discontinuities, faults defining imbricate structures), etc. whose geometric positions are known, the method therefor—subdivides geological objects into layers or banks that are modeled; discretized by grids, and the tectonic deformation of each modeled layer is determined separately taking its thickness and length into account as far as possible.

Preferably, each geological object is defined by forming a grid comprising superimposed series of meshes or cells, the various series being positioned successively starting from a first series of cells at least one side of which belongs to the limits of the geological object.

According to a first embodiment, the various cells in each series are defined step by step, each of the cells being formed by positioning a first node defined by a curvilinear abscissa and a second node, the coordinates of the first and the second node being obtained by geometric relationships linked to the dimensions and shape of each cell.

According to a second embodiment, the positions of each series of cells are defined globally by minimizing a function whose variables are the coordinates of the nodes of the various cells in the series, this function also being formed from at least two geometric relationships associated with each of the grids.

The method also includes a stage in which the grids are geometrically modified to take into account the effects of compaction (due for example to the different degrees of burial of the grid elements).

For example, a grid with polygonal cells having four main nodes and possibly at least one secondary node can be used.

Models of a formation affected by faults according to the method gives refined information on its geometric evolution in two dimensions and easily connects the deformations linked to the set of faults with compaction phenomena. A study of heat and fluid transfers is then made possible on the scale of a sedimentary basin, allowing zones likely to contain hydrocarbon deposits to be selected more easily.

The method according to the invention allows better simulation of two folding mechanisms that are fundamental for geologists working with orogens and their forelands: a) isopaque kink folds or fault-bend folds, or b) fault propagation folds.

Finally, with the method proposed, it is possible to take the complex structural configuration into account: several major detachment levels (major faults) with deep duplex branching and antithetic faults.

Other advantages and characteristics of the method according to the invention will emerge from reading the description hereinbelow of two embodiments described as nonlimiting examples with reference to the attached drawings wherein:

BRIEF DESCRIPTION OF THE DRAWINGS

FIG. 5 shows a grid applied to a geological medium without taking the effects of compaction into account; and FIG. 6 shows the changes made to the preceding grid when the effects of compaction are taken into account.

DESCRIPTION OF THE PREFERRED EMBODIMENTS

The model developed is of the geometric type; it is based on subdivision principles well known to geologists who have to make balanced sections, and involves natural kinematic mechanisms.

Formation of the model involves first dividing a domain under study into a list of imbricate structures defined by faults, dividing each imbricate structure into a list of layers or "banks" that are defined by the stratigraphy of the domain under study, and dividing each bank into a list of elements.

To accomplish this dividing process, the following assumptions are made:

that the "banks" are so-called "competent" units that undergo little deformation when they shift, and in particular that the thickness of the banks can be preserved;

that the banks can slide relative to each other along stratigraphic discontinuities.

Model 1: Calculation at Elementary Level

According to a first embodiment, the elements are considered to be reconstructed individually. Modeling proceeds step by step, considering first the elements or cells based on limits chosen for the modeling process: stratigraphic limit serving as a support and/or fault. The various elements are represented by polygons with four main nodes and a certain number of secondary nodes (pseudo-quadrilaterals).

Figure 1:
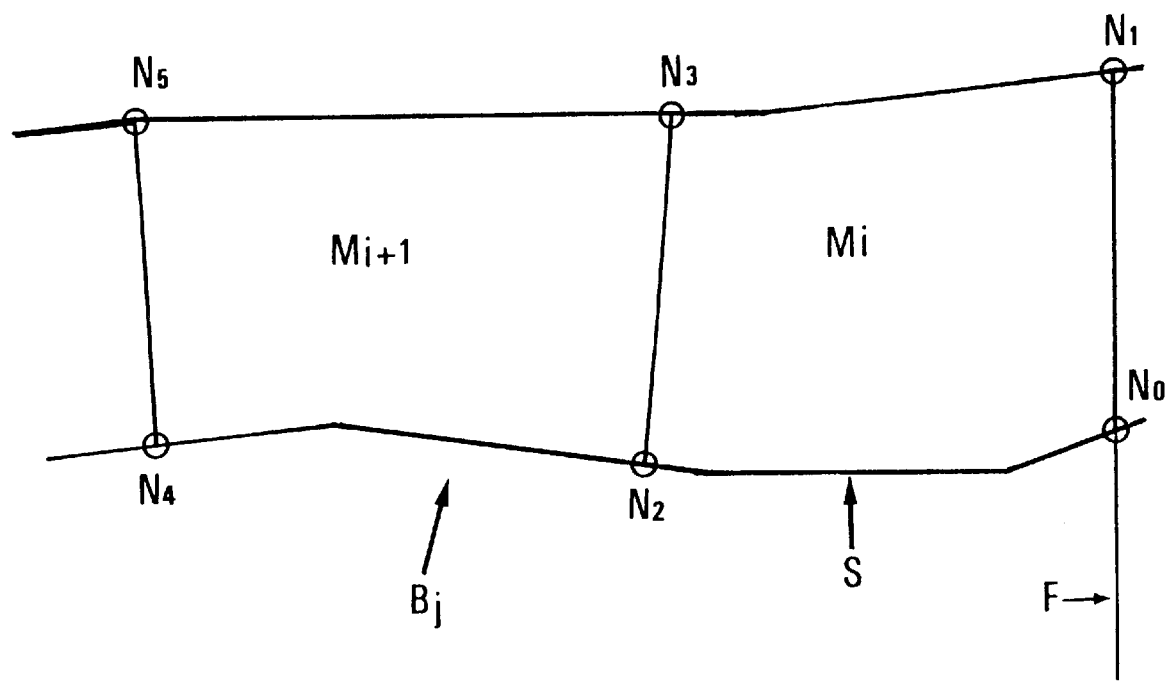
FIG. 1 illustrates the formation mode of polygonal cells provided with four main nodes.
Figure 2:
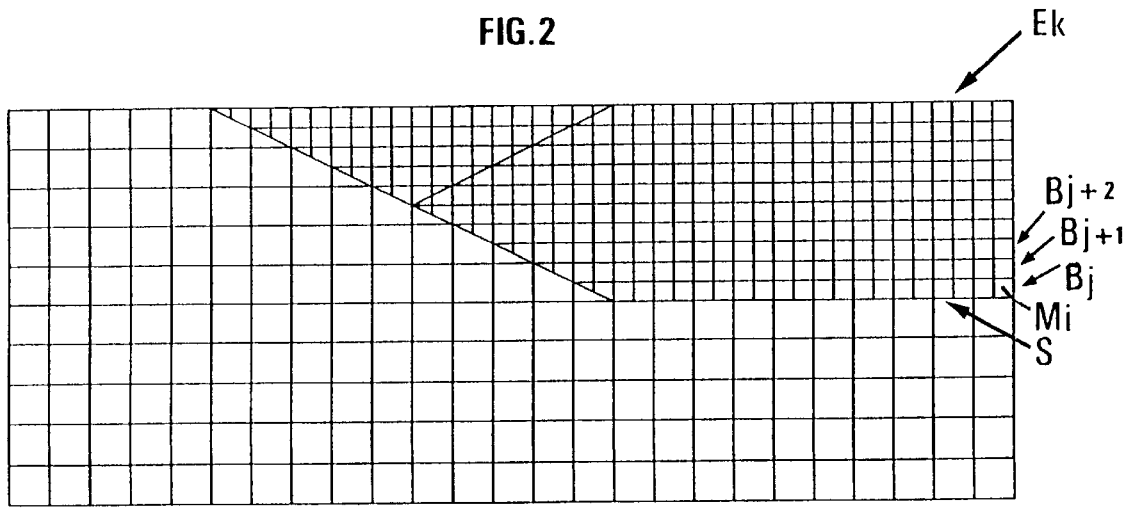
FIG. 2 shows a geological medium divided into several imbricate structures by natural limits (faults and stratigraphic discontinuities), each being defined and subdivided into cells.

With reference to FIG. 1 an imbricate structure Ek (FIG. 2), an initial element (or cell) Mi is formed in a bank Bj in contact for example with a discontinuity S serving as a support at its base and with a fault F. The positions for example of two of the main nodes N0, N1 of cell Mi both on the fault line are known (FIG. 1). Element Mi is reconstructed by positioning the other two nodes N2 and N3. Scalar values are established for the area of the element and its thickness, and a criterion is established for angular orientation of the side passing through the two remaining nodes N2, N3 relative to support S. Since node N2 rests on support S, its position is pinpointed by a curvilinear abscissa (a single degree of freedom). The other node N3 has two degrees of freedom in plane 2D. The positions of the two nodes are determined by writing three relationships linking their abscissas and ordinates to the values and criterion established. Cell Mi has a secondary node.

The following element Mi+1 in the same bank Bj also rests on support S. Since it rests laterally on the edge of the preceding element Mi just defined, the positions of whose nodes N2, N3 are known, the next step is to determine by the same three relationships (area, thickness, and orientation criterion) the respective positions of vertex N4 on support S and of node N5 in the plane.

Thus, step by step, all the elements of the same initial bank Bj are defined. Once all the cells of this first bank Bj have been positioned, all the elements of adjacent bank Bj+1 (FIG. 2) are positioned stepwise, considering the sides of the cells connecting nodes N1, N3, N5 (upper limit of previous bank) to be known, starting from the first element resting for example against the lateral limit of the bank and so forth for all the banks in the stack.

Model 2: Global Modeling of a Bank

According to another embodiment, the elements of which a given bank is composed are all reconstructed at the same time.

Instead of applying the definition criteria successively to the various elements or cells of a given bank Mi, Mi+1, etc., they are applied here to the bank as a whole. In the same way, for each one of them, relationships connecting the coordinates of the various nodes with the area, thickness, and shape of the elements are written.

Writing the sum of the squares of the residues of all the relationships allows a positive function to be constructed whose variables are the coordinates of the nodes of the elements. The stage of geometric reconstruction of the bank is the result of a minimization calculation of the function thus constructed.

II) Effects of Compaction

Figure 3:
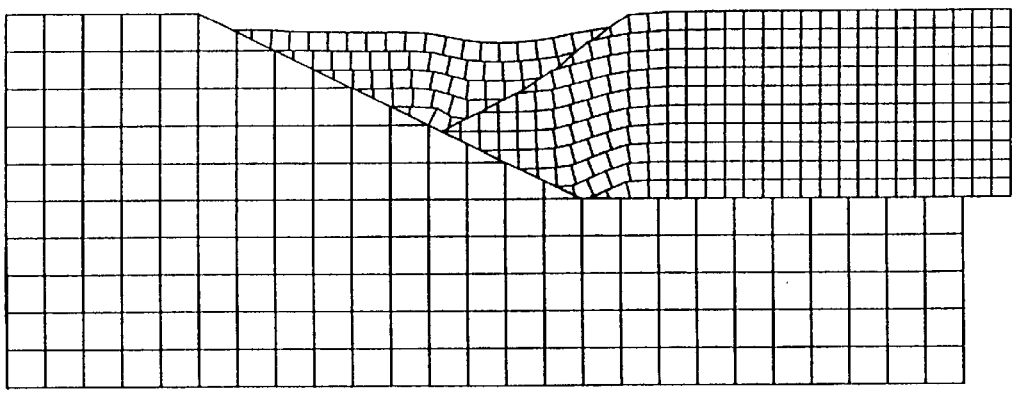
FIG. 3 shows the configuration of this same medium after a relative retreat of an imbricate structure, determined by application of the method according to the invention.
Figure 4:
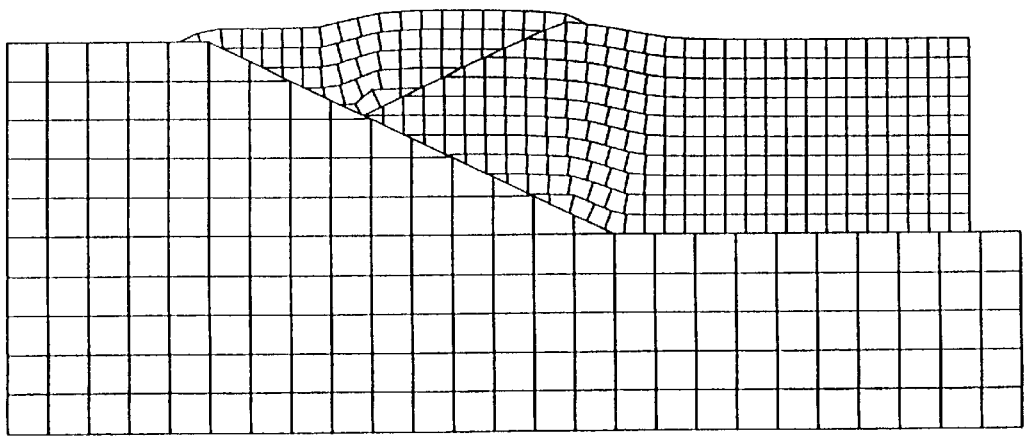
FIG. 4 shows another configuration of this same medium after a relative advance of an imbricate structure, obtained by the same method.

The method allows the effects of compaction, which modifies rock porosity, to be taken into account. The effect can be accounted for because of the presence of any new modeled bank in the grid of underlying banks or any shift in the imbricate structures which modifies their degree of burial (FIGS. 3, 4). It is easy to reconstruct the successive states of the formation on the basis of the decrease in porosity of the geological materials when buried, which has the effect of modifying the areas of the various elements, with reference in particular to the following article:

Perrier and Quiblier, J., "Thickness in Sedimentary Layers during Compaction History,: AAPG Bull., 58, 507–520.

We claim:

1. A method of modeling geological sections of a formation having tectonic deformations, in order to determine a position of hydrocarbon deposits, said method comprising:

(a) selecting an undeformed initial geometry of the formation composed of geological objects having determined boundaries;

(b) dividing the geological objects into beds;

(c) defining separately each bed with a grid including a superposed series of meshes provided with nodes;

(d) separately and successively applying tectonic deformations to the series of meshes while preserving a thickness and length thereof, beginning with a first series of meshes having at least one side of the first series belonging to a boundary of the geological objects; and (e) studying transfer of heat and fluids in a sedimentary basin modeled in accordance with a model produced from steps (a)–(d) to determine zones most likely to contain hydrocarbon deposits.

2. A method as claimed in claim 1, further comprising:

progressively defining the series of meshes, each of the meshes being determined by positioning a first node defined by a curvilinear abscissa and a second node, coordinates of the first and the second nodes being obtained by geometric relationships linked to dimensions and a shape of each mesh.

3. A method as claimed in claim 1, further comprising:

defining a complete position of each series of meshes by reducing to a minimum a function depending on variables, the variables being coordinates of nodes of the series of members, the function being set up on a basis of at least two geometric relationships associated with each of the meshes.

4. A method as claimed in claim 1 further comprising:

geometrically modifying the series of meshes to take into account effects of compaction.

5. A method as claimed in claim 1 further comprising:

geometrically modifying the series of meshes to take into account effects of compaction.

6. A method as claimed in claim 1 further comprising:

setting up a grid with meshes in the form of polygons, comprising four main nodes.

7. A method as claimed in claim 1 further comprising:

setting up a grid with meshes in the form of polygons, comprising four main nodes.

8. A method in accordance with claim 6 wherein:

the polygon further comprises at least one secondary node.

9. A method in accordance with claim 6 wherein:

the polygon further comprises at least one secondary node.

* * * * *